United States Patent
Ando et al.

[11] Patent Number: 6,075,331
[45] Date of Patent: Jun. 13, 2000

[54] SYSTEMS AND METHODS FOR MANAGING ENERGY OF ELECTRIC POWER SUPPLY SYSTEMS

[75] Inventors: Masao Ando, Davis; Andrew A. Frank, El Macero, both of Calif.

[73] Assignee: Imra America, Inc., Ann Arbor, Mich.

[21] Appl. No.: 08/034,707

[22] Filed: Mar. 18, 1993

[51] Int. Cl.$^7$ ........................................ H02P 3/00
[52] U.S. Cl. ...................... 318/376; 388/831; 388/920; 307/48; 320/138; 320/166
[58] Field of Search ....................... 318/580, 587, 318/804, 805, 798, 799, 727, 778, 781, 796, 782, 786, 139, 119, 134, 375–381; 60/608, 607; 307/240, 241, 571, 242, 239, 45, 46, 66, 48; 361/33, 91, 86, 15; 363/126, 21, 18, 16, 131, 136, 123, 124; 388/831, 905, 919, 920; 320/103, 118, 121, 138, 166

[56] References Cited

U.S. PATENT DOCUMENTS

| | | | |
|---|---|---|---|
| 3,582,764 | 6/1971 | Huber | 363/124 |
| 3,603,814 | 9/1971 | Ohashi | 307/240 |
| 3,614,586 | 10/1971 | King | 388/831 |
| 3,753,001 | 8/1973 | Hiroshima et al. | 307/10 R |
| 3,798,527 | 3/1974 | Du Plessix et al. | 320/6 |
| 3,932,792 | 1/1976 | Massie | 318/119 |
| 3,938,015 | 2/1976 | Beebe | 318/139 |
| 4,167,170 | 9/1979 | Sohner et al. | 123/644 |
| 4,187,449 | 2/1980 | Knoble | 363/155 |
| 4,394,719 | 7/1983 | Moberg | 363/131 |
| 4,401,926 | 8/1983 | Morton et al. | 318/376 |
| 4,409,538 | 10/1983 | Tabata | 320/11 |
| 4,438,424 | 3/1984 | Yasui | 280/735 |
| 4,554,999 | 11/1985 | Kamaike | 318/800 |
| 4,585,085 | 4/1986 | Handel et al. | 180/65.2 |
| 4,612,492 | 9/1986 | Burk | 320/3 |
| 4,879,623 | 11/1989 | Baumgartner et al. | 361/33 |
| 4,977,493 | 12/1990 | Smith | 363/126 |
| 5,038,566 | 8/1991 | Hara | 60/608 |
| 5,041,776 | 8/1991 | Shirata et al. | 320/1 |
| 5,045,835 | 9/1991 | Masegi et al. | 340/438 |
| 5,053,682 | 10/1991 | Shoda et al. | 315/223 |
| 5,105,776 | 4/1992 | Tsuchiya et al. | 123/192.1 |
| 5,119,010 | 6/1992 | Shirata et al. | 320/15 |
| 5,146,095 | 9/1992 | Tsuchiya et al. | 290/38 R |
| 5,146,394 | 9/1992 | Ishii et al. | 363/16 |
| 5,155,373 | 10/1992 | Tsuchiya et al. | 290/38 R |
| 5,155,374 | 10/1992 | Shirata et al. | 290/38 R |
| 5,204,610 | 4/1993 | Pierson et al. | 320/15 |
| 5,256,956 | 10/1993 | Tsuchiya et al. | 320/15 |
| 5,373,195 | 12/1994 | DeDoncker et al. | 323/222 |
| 5,373,463 | 12/1994 | Jones, Jr. | 365/145 |
| 5,412,293 | 5/1995 | Minezawa et al. | 318/376 |

*Primary Examiner*—David Martin
*Attorney, Agent, or Firm*—Burns, Doane, Swecker & Mathis, LLP

[57] ABSTRACT

An energy management system for optimizing low power and short term high power states of a power supply system. A significant feature of the present invention relates to a design of a power supply apparatus based on internal resistances of the power supply components. In an exemplary embodiment, the power supply supplies power for driving a load. The power supply includes a power source having a first internal resistance and includes a capacitor connected in parallel with the power supply and having a second internal resistance. The first internal resistance and the second internal resistance have a predetermined relationship.

6 Claims, 3 Drawing Sheets

SYSTEMS AND METHODS FOR MANAGING ENERGY OF ELECTRIC POWER SUPPLY SYSTEMS

BACKGROUND OF THE INVENTION

1. Field of the Invention

The present invention relates generally to supplying power for electric systems. More particularly, the invention relates to systems and methods for managing the energy supplied from a power source to accommodate peak power requirements of a load.

2. State of the Art

The power density of an all electric system is often a limiting factor which restricts design flexibility. For example, an electric system requiring 50 kilowatts for 1 second, but only requiring 1 kilowatt during all other normal operations can be considered to have an average power of slightly over 1 kilowatt, but a peak power of 50 kilowatts. In this electric system, the 1 kilowatt operating state represents a low power state, while the 50 kilowatt peak power represents a short-term, high power state. Such a system is designed with electrical components that are compatible with peak power requirements of the high power state.

Exemplary systems wherein at least two such states exist include electric motor control systems. In such a system, a high power state can exist during periods of motor acceleration (e.g., motor start-up). Other exemplary systems where dual states of a power supply are required include X-ray machines and power supply systems for electrically heated catalysts (e.g., catalysts which are not continuously operated, such as in the case of catalytic converters used in automobiles). In each of the cases, the entire electric system (i.e., all control components), must be sized to accommodate the second high power state.

U.S. Pat. No. 5,041,776, assigned to Isuzu Motors, Ltd., discloses a power supply device for use on a motor vehicle for supplying stored electric power to an electric load such as a vehicle engine starter motor. This patent discloses using a parallel arrangement of a battery and capacitor. U.S. Pat. Nos. 5,155,373, 5,155,374 and 5,146,095, all assigned to Isuzu, disclose similar systems. For example, U.S. Pat. No. 5,155,374 allows higher voltage to be supplied to a vehicle engine starter motor by serially stacking a battery and a capacitor. The capacitor is recharged at a fixed rate using relatively complex circuitry. A serial connection of the battery and capacitor permits a doubling of the voltage supplied. By doubling the voltage via use of the capacitor, peak charge requirements of the battery can be reduced.

Although the Isuzu patents generally disclose using a capacitor in parallel with a battery, these patents do not disclose criteria for optimizing the relative size and power capabilities of the battery and the capacitor to reduce peak power requirements of the battery. Further, the circuits described in these patents merely permit the battery voltage to be doubled by, for example, serially connecting the battery and capacitor.

Accordingly, there is a need for identifying criteria which can be used to optimize relative size and power capabilities of a power source and a capacitor included in a power supply system so that energy management of the power supply system can be optimized. Further, there is a need for an electric system which can accommodate plural states, or operating conditions, without significantly limiting system design flexibility.

SUMMARY OF THE INVENTION

The present invention is directed to an energy management system for optimizing low power and short term high power states of a power supply system. A significant feature of the present invention relates to a design of a power supply apparatus based on internal resistances of the power supply components. In an exemplary embodiment, the power supply apparatus includes means for supplying power and means driven by the power supply means. The power supply means includes means for providing a power source having a first internal resistance. Further, the power supply means includes a capacitor connected in parallel with the power supply and having a second internal resistance, the first internal resistance and the second internal resistance having a predetermined relationship.

By designing an energy management system based on a predetermined relationship of internal resistances between a power source and a capacitor, the power efficiency of the power source can be increased by, for example, 20–50%. This translates into increased cycle life of the power source (e.g., batteries). The present invention can prolong the total life of the power source by reducing the average current draw from the power source, and provide high power from a circuit which is of relatively small size.

Further, the present invention can increase power density, such that power requirements of a power source can be separated from power requirements of a load. In accordance with the present invention, the entire system need not be designed with components that accommodate peak power requirements. Rather, the system is designed to accommodate a duty cycle over which short term, high power requirements exist. A system designed in accordance with the present invention can include portions (e.g., components located between the power source and the capacitor) which are sized to accommodate the average power requirements for the load to be driven, while still satisfying peak power requirements of the load. The size of the overall electric system can therefore be greatly reduced.

For example, an X-ray machine requiring 50 kilowatts for 1 second can have a 1 kilowatt power source charging a power storage device such as a capacitor for 50 seconds. By establishing a predetermined relationship of internal resistances, the power storage device will discharge peak power to a load during the 1 second duty cycle of the high power state. The power source will thereby operate independently of peak power produced by the storage device during its discharge and independently of peak regenerative power produced by the load. Thus, the power source and components associated with the power source can be reduced in size and power rating. The present invention can be extended to driving any load, including electric motors and power supply systems for electrically heated catalysts.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
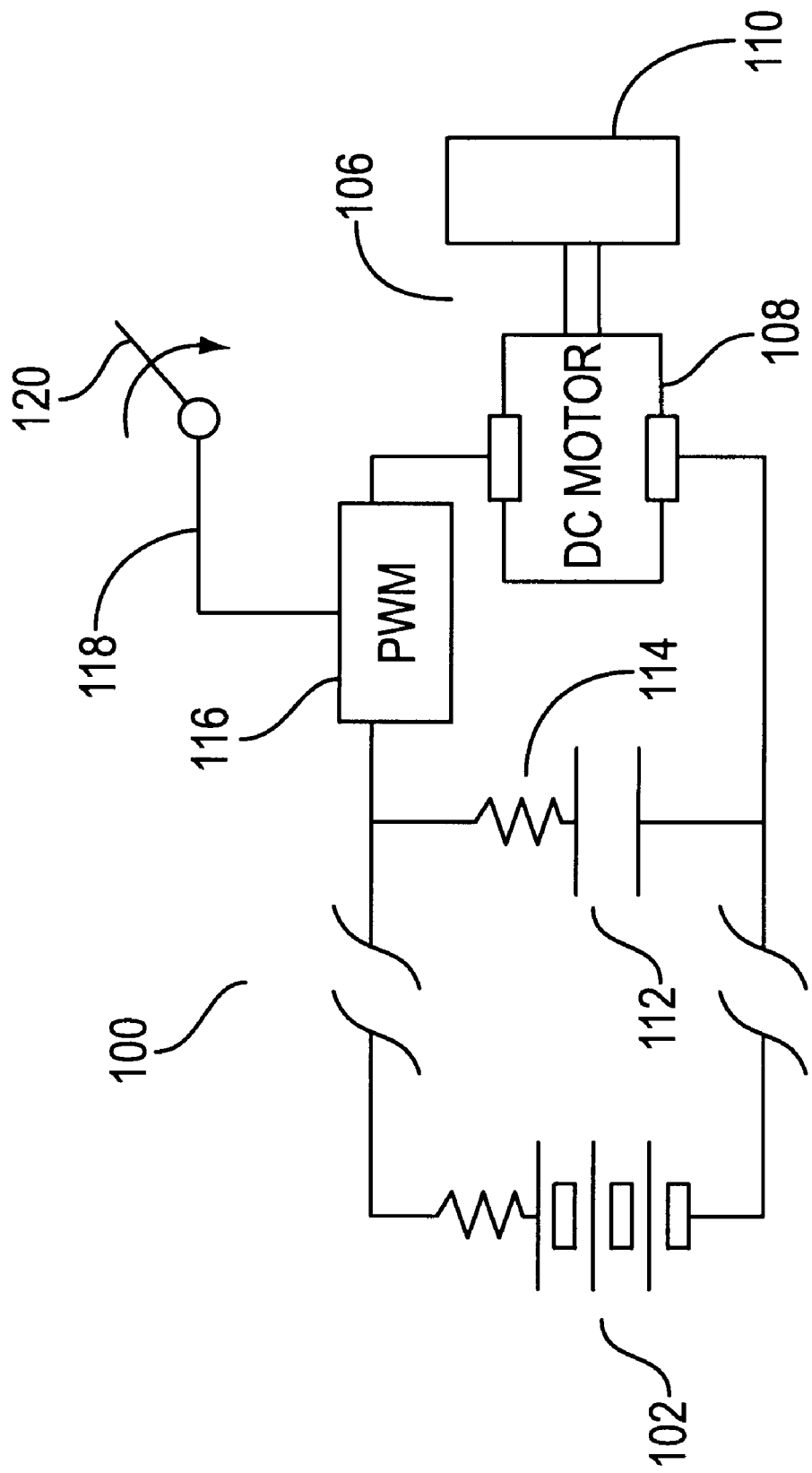
FIG. 1 illustrates an exemplary embodiment of the present invention.

FIG. 1 illustrates an exemplary system 100 for producing a power output in accordance with the is present invention.

The FIG. 1 system includes a means for supplying power to a load. The power supply means includes a power source represented as the battery 102 having a first internal resistance 104. The resistance 104 is illustrated in the FIG. 1 circuit as the resistance labelled $R_i$ Bat. While the exemplary embodiments described herein refer to use of a DC energy source, those skilled in the art will recognize that an AC source can be used as well.

Further, the power supply means includes a capacitor 112 connected in parallel with the battery 102. The capacitor 112 has an internal resistance represented in the FIG. 1 circuit as resistance 114, labelled $R_iC$.

In addition to the power supply means, the FIG. 1 system includes means driven by the battery 102. In the exemplary FIG. 1 embodiment, the driven means 106 is illustrated as an electrical load which includes a DC motor 108. The driven means can also include a mechanical load. For example, the mechanical load can include a means for recharging the capacitor using power provided from the driven means during a regenerative braking mode. In the exemplary FIG. 1 embodiment, the recharging means includes a flywheel 110 (or other kinetic energy storage device for storing energy such as the velocity of a mass due to inertia) driven by the DC motor 108 in a generator mode to supply reverse, regenerative current to the capacitor 112 during a regenerative braking mode.

The FIG. 1 system further includes a means for modulating current applied from the capacitor to the driven means, represented as a pulse width modulation (PWM) controller 116. The pulse width modulation controller 116 is connected in series between the capacitor 112 and the driven means 106. The pulse width modulation controller 116 can be regulated to adjust pulse width in response to a control input 118. For example, where the driven means is an electric motor of a vehicle, the pulse width produced by the pulse width modulation controller 116 can be adjusted proportionately to a user command input, such as the position of an accelerator control pedal 120.

The parallel combination of the battery 102 and the capacitor 112 can be used to drive the DC motor 108 under varying load conditions. For example, where the DC motor 108 is an electric motor of a vehicle, the power supply means of the FIG. 1 system can drive the motor during normal, low power load conditions, and can also provide acceleration to satisfy high power, increased load conditions.

By designing a circuit using a predetermined relationship between the internal resistance of a parallel battery and capacitor, power efficient operating modes can be established for both the low power and the high power states. By selecting a predetermined relationship in accordance with the present invention, the battery can be designed with reduced peak power requirements since peak power requirements of a load driven by the FIG. 1 system are satisfied by the capacitor. The primary function of the battery is merely to recharge the capacitor using an average current.

To achieve this control, the pulse width modulation controller 116 responds to the accelerator control pedal 120 to adjust the current supply to the motor 108. During high load, high power operating states, the relatively low resistance capacitor 112 will supply high current to the load until its voltage drops. This period of time during which the capacitor can supply high current corresponds to its duty cycle. Thus, the circuit is designed so that the capacitor can provide the high power requirements of the load for this duty cycle.

While parallel combinations of batteries and capacitors are known, the effectiveness of such a parallel combination in providing adequate power supply to a load has not previously been determined as a function of internal resistance. In accordance with a feature of the present invention, it has been recognized that the effective operation of the FIG. 1 system depends on the relative internal resistance of the battery and capacitor.

For example, in using the present invention to drive a vehicle drive motor, the internal resistance of the capacitor, $R_iC$, is selected to be less than 0.3 times the internal resistance of the battery, $R_i$ Bat. In other words, a predetermined relationship between the internal resistance of the battery relative to that of the capacitor is selected such that a ratio of the internal resistance of the battery to the internal resistance of the capacitor is no greater than 0.3. This ratio effectively allows the capacitor to satisfy peak power requirements of the load, such that the battery merely recharges the capacitor during normal operating modes.

In an application where an electric motor of a vehicle is being driven, a low power state can be provided whereby the vehicle is continuously running. In accordance with the present invention, the range of a continuous running, low power state for a power supply system having a given size and power source can be significantly improved. Further, the peak power which can be provided during a high power state from the power supply system can be increased so that, for example, rapid acceleration can be achieved using a large current from the capacitor.

Because a capacitor with relatively low internal resistance is used with a power supply of relatively high internal resistance in the FIG. 1 embodiment, the battery need not be rated for the peak power requirements of the load. Regenerative currents charge the relatively low resistance capacitor, such that peak currents from the recharging means will not damage the battery. The battery as well as components between the battery and the capacitor therefore need not be designed to accommodate peak power of the load. Further, complex control circuitry for satisfying peak power requirements of a load and for regulating recharging currents supplied to the capacitor can be avoided. Thus, size of the overall electric system can be greatly reduced. In an exemplary embodiment, the high power capacitor and motor/controller can be designed in one package with all high voltage and current handling components integral.

Of course, various types of capacitors can be used in the foregoing circuit. One such capacitor is a conventional tubular electric capacitor (TEC). In an exemplary embodiment, such a TEC can be used having an internal resistance of 25 milliohms for a capacitance of 0.01 Farads. The use of such a capacitor can improve the durability of the power supply by, for example, 50% or higher, depending on the ratio of peak power to average power. However, for a given capacitance, TECs are generally large in size relative to available capacitors having high capacitance density (e.g., ultracapacitors or supercapacitors), and therefore less desirable when overall dimensions are a constraint for the system.

Accordingly, available capacitors which have relatively high capacitance density can be used in the FIG. 1 system. For example, known ultracapacitors are of relatively small size and weight relative to conventional capacitors such as the TEC mentioned above. Accordingly, ultracapacitors are desired for environments where overall dimensions are a constraint. Although ultracapacitors having the lowest internal resistance are desired, a typical ultracapacitor has higher internal resistance than TECs of a given capacitance. For example, with a capacitance of 0.01 Farads, a typical ultracapacitor which can provide power equivalent to the TEC described above would have an internal resistance of 7 ohms.

The relatively high internal resistance of ultracapacitors hinders their effectiveness in the FIG. 1 energy management system. That is, the high internal resistance hinders an ability of the FIG. 1 system to supply peak power requirements of the load primarily from the capacitor. Rather, increased current will be provided from the battery as well, with the amount of current being a function of the relative internal resistance for the battery and the capacitor. Further, peak regenerative currents produced by the recharging means can damage the battery if the internal resistance of the capacitor approaches or exceeds that of the battery.

Accordingly, alternate embodiments of the invention mitigate the effect of the relatively high internal resistance associated with conventional ultracapacitors. For example, alternate embodiments of the present invention include power supply systems which control the output power of the power supply system. Two exemplary embodiments will be discussed with respect to FIGS. 2 and 3.

Figure 2:
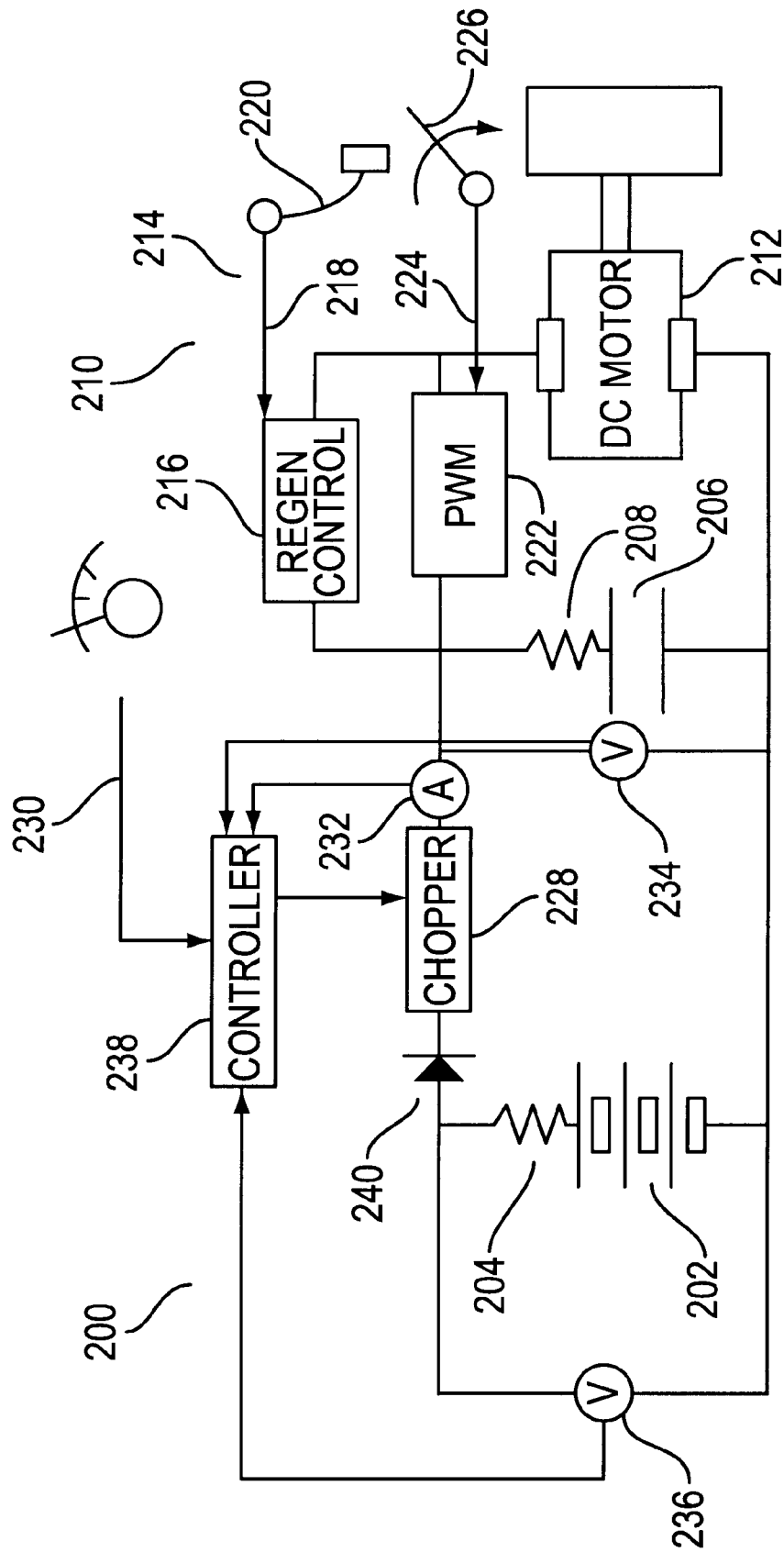
FIG. 2 illustrates an alternate embodiment of the present invention for providing average current control.

FIG. 2 represents an average current controller and includes means for maintaining a voltage of the capacitor equal to a voltage of the power source. The FIG. 2 system limits current from the power source to a predetermined value. The FIG. 3 system represents a supercharge controller and includes means for charging the capacitor to a voltage greater than the power source. In both the FIG. 2 and FIG. 3 embodiments, either a conventional capacitor or an ultracapacitor can be used since the detrimental effects of a capacitor having high internal resistance relative to the internal resistance of the power source are avoided. However, to achieve size and weight benefits, these embodiments will be discussed as including an ultracapacitor in a parallel combination with a power source.

Referring to the FIG. 2 system 200, a power supply means includes a battery 202 having an internal resistance 204. A capacitor, such as an ultracapacitor 206 having an internal resistance 208, is connected in parallel with the battery 202. In the FIG. 2 embodiment, a predetermined ratio of the internal resistance of the battery with respect to the internal resistance of the capacitor can range below or above 0.3, and can, for example, be 1 or 2. The FIG. 2 system further includes a means driven by the power supply means which is represented by the numeral 210 and includes a DC motor 212 and a recharging means 214.

The recharging means includes a regenerator controller 216 for regulating current used to recharge the ultracapacitor 206. The regenerator controller 216 is controlled in response to a control set point on line 218. Where the DC motor 212 is an electric motor for a vehicle, the control set point 218 can be proportional to a position of a brake pedal 220.

As with the FIG. 1 system, the FIG. 2 system 200 further includes means for modulating current supplied from the capacitor. For example, the modulating means can include a pulse width modulation controller 222 which is connected in series between the capacitor 206 and the DC motor 212. Like the pulse width modulator of the FIG. 1 system, the pulse width modulator 222 can include, for example, transistors which switch the current to provide a pulse width that is dependent on the signal at a control input 224. Where the DC motor 212 is an electric motor for a vehicle, the control input 224 can be a signal proportional to the position of an accelerator control pedal 226.

In accordance with the FIG. 2 embodiment, a means is provided for maintaining a voltage of the capacitor equal to a voltage of the power source (i.e., battery 202) and for regulating current from the power source to maintain the current below a predetermined value. The voltage maintaining and current regulating means includes means for gating the current from the power source, such as a chopper 228. As with the pulse width modulation controller 222, the chopper 228 can include one or more switches, such as transistors, for controlling the current available from the battery 202 to the capacitor 206.

The current regulating means further includes means for establishing a current limit, such as an adjustable set point 230. Further, the current regulating means includes means for monitoring power produced by the switching means and for monitoring the power source. The monitoring means can include, for example, a current sensor 232 for monitoring current output from the chopper 228, a voltage sensor 234 for monitoring voltage across the capacitor 206 and a second voltage sensor 236 for monitoring the voltage of the battery 202.

Use of the chopper 228 permits the use of a capacitor in parallel with the battery where the capacitor has an internal resistance greater than that of the battery. The chopper limits the battery supply current so that the capacitor will provide peak current requirements of the load during off times of the chopper. When the chopper circuit is gated on, current is supplied from the battery to both the capacitor and the load, thus recharging the capacitor. The voltage at the capacitor is permitted to drop below that of the battery during "off" times of the chopper. During "on" times of the chopper, the voltage of the capacitor is recharged to that of the battery using a regulated current.

Outputs from each of the current and voltage sensors are input to a means for controlling the gating means 228. The controlling means is represented as a controller 238. The controller 238 also receives the signal from the adjustable set point 230. Based on a comparison of these inputs, the controller 238 regulates the chopper to limit the current amplitude and/or frequency output from the chopper 228.

In an exemplary embodiment, the controller 238 gates the chopper "on" or "off" on the basis of the difference between the battery voltage measured by the second voltage sensor 236 and the capacitor voltage measured by the voltage sensor 234. When gated "on", the controller limits current based on a comparison of the difference between the adjustable set point 230 and the output of the current sensor 232.

Where the chopper 228 is a single switch (e.g. transistor, FET or SCR), the switch is gated on and off by comparing the output of the voltage differential within the controller 238 with a threshold. When the difference between the battery voltage and the capacitor voltage is greater than a maximum voltage set point, the current regulating means can be considered "on". The threshold can be established based on the expected duty cycle over which the capacitor is expected to provide peak power for a given load. If a difference of the battery voltage minus the capacitor voltage is less than a maximum voltage but greater than a minimum voltage (e.g., 0V), the current regulator can be considered "off".

The adjustable set point 230 is used to provide an average current limit set point in response to a user input for extending the battery life. Of course, the performance of the motor driven by the power supply will be affected by this current limit. A relatively low current limit will reduce the capacitor recharge rate and extend the range of available operation for a low power state. A relatively high average current limit will increase the capacitor recharge rate and allow longer duty cycles of the high power state, but will reduce the overall operating range.

During "on" periods of the chopper, current can be supplied from the battery to the capacitor, with the amplitude being limited to the value established by the adjustable set point 230. When the current limit is set low, a maximum vehicle speed is limited, while a high current limit allows the speed of DC motor 212 to be increased. In this latter mode however, the battery life is shortened.

The controller 238 regulates the chopper 228 to control pulse width. In an exemplary embodiment, a frequency of the chopper 228 is regulated by the controller 238 at 22 kilohertz. However, those skilled in the art will recognize that any control technique which regulates power output to the load can be used.

When the DC motor is accelerated, the capacitor 206 provides bursts of power. The chopper 228 is controlled by the controller 238 to regulate the recharge current from the battery 202. During deceleration of the motor, the voltage of the capacitor 206 becomes greater than the voltage of the battery. If the battery is recharged rapidly, the battery life can be detrimentally affected. Therefore, a diode 240 is provided in series between the battery 202 and the chopper 228 to permit current flow from the battery to the chopper in one direction only. The diode 240 only permits current flow from the battery to the capacitor when the capacitor voltage drops below that of the battery (i.e., during a chopper "on" state).

Thus, in a deceleration/braking mode of operation, only the capacitor 206 is recharged by power from the regenerator controller 216. This arrangement restricts the use of high current generated during a regenerative control mode to be used for charging the capacitor so that the battery is not damaged. In an alternate embodiment, a separate recharging circuit with reduced peak power (i.e., relative to peak power of the regenerator controller 216) can be used to recharge the battery.

In an exemplary embodiment, the pulse width modulation controller 222 and the regenerator controller 216 are well known devices which can be readily obtained. For example, exemplary embodiments of the present invention can include a regenerator controller and a pulse width modulation controller available from Servo-systems, Inc.

The pulse width of the pulse width modulation controller 222 is controlled as a function of the accelerator control pedal 226 to provide acceleration control of the DC motor 212. However, where speed control of the DC motor 212 is desired, a speed feedback signal from the DC motor can be differentially combined with the control signal on the control input 224 to provide a difference signal. In this latter embodiment, the pulse width modulation controller 222 can further include a proportional-integral-differential (PID) controller for receiving the difference signal. PID controllers are known in the art and need not be described in detail. The PID controller can be responsive to the difference signal to provide a closed-loop operation of the current input to the pulse width modulation controller 222.

Further, those skilled in the art will recognize that while a current limit is used as a set point in the FIG. 2 circuit, other set points can be substituted. For example, the FIG. 2 circuit can operate on the basis of a power limit.

Figure 3:
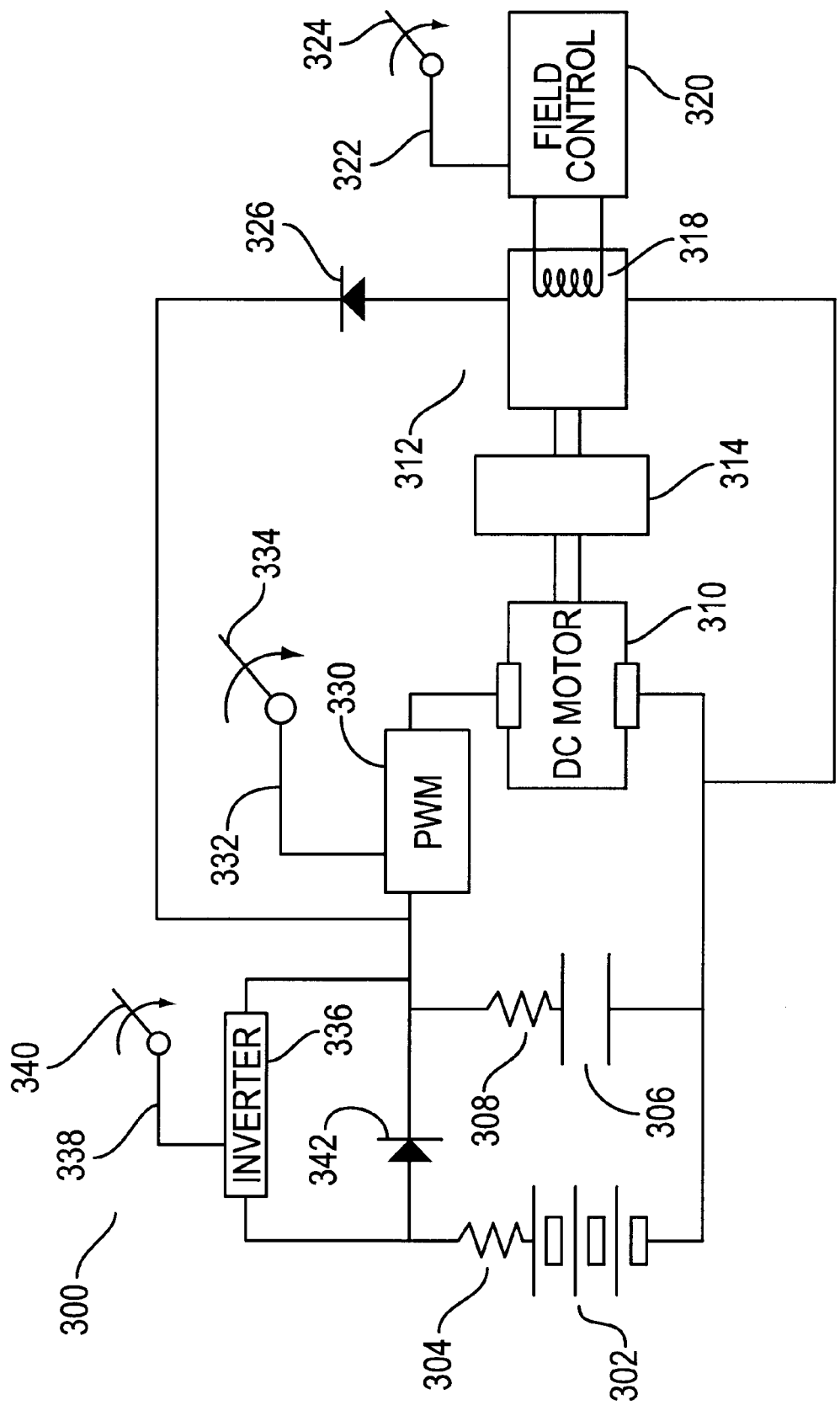
FIG. 3 illustrates an alternate embodiment of the invention for providing supercharged voltage control.

FIG. 3 illustrates an alternate exemplary embodiment of the present invention wherein a capacitor having relatively high capacitance density and high internal resistance (e.g., an ultracapacitor) can be used to provide advantages in accordance with the present invention. As mentioned previously, the FIG. 3 embodiment is based on a supercharge control feature.

As illustrated in FIG. 3, a system for producing a power output, represented generally as system 300, includes a power supply means and means driven by the power supply means. The power supply means includes a battery 302 having an internal resistance 304 in parallel with a capacitor 306 having an internal resistance 308. As with the FIG. 2 embodiment, the capacitor 306 in FIG. 3 can be an ultracapacitor. Similarly, a ratio of the internal resistance of the capacitor 306 and the power supply can be at, below or above 0.3.

The driven means includes a load represented as a DC motor 310 and a recharging means 312. The recharging means 312 includes, for example, a flywheel 314 connected to a shaft of the DC motor 310. Further, the recharging means 312 can include an alternator 316 having a coil 318 and a field control 320. The field control 320 is regulated in response to a control input 322. The recharging means of the FIG. 3 embodiment further includes a diode 342 which limits current flow from the battery to the capacitor and prevents current generated during a regenerative mode (i.e., braking mode) from being directed back to the battery where it can detrimentally affect the battery.

In an exemplary embodiment where the DC motor is used in an electric vehicle, the control input 322 can be adjusted in response to a position of a brake pedal 324. A switch such as a diode 326 can also be provided to restrict the flow of current from the recharging means to the capacitor 306 so that current flow does not occur during periods when the capacitor 306 is driving the DC motor 310.

The FIG. 3 system, like the systems of FIGS. 1 and 2, also includes means for modulating current from the capacitor of the power supply means. As with the embodiments of FIGS. 1 and 2, the modulating means can include a pulse width modulation controller 330 which is operated in response to a control input 332. Where the electric motor 310 is used in an electric vehicle, the control input 332 can be a signal proportional to a position of an accelerator pedal 334. Operation of the pulse width modulation controller 330 is similar to the pulse width modulation controller described with respect to FIGS. 1 and 2. In an alternate embodiment, the pulse width modulation controller can receive a motor speed feedback signal and include a PID controller to provide speed regulation of the motor as described with respect to FIG. 2.

In accordance with a significant feature of the FIG. 3 system, a means is provided for charging the capacitor 306 to a voltage greater than that of the battery 302 (i.e., supercharge control). This supercharging of the capacitor can be provided when the capacitor is charged by the battery. In alternate embodiments, supercharging of the capacitor can also be performed when the capacitor is being charged during a regenerative braking mode.

The charging means used to charge the capacitor from the battery 302 includes means for inverting a DC voltage output of the battery 302 to an AC voltage, and for converting the AC voltage to a DC voltage for input to the pulse width modulation controller 330. In the exemplary system illustrated in FIG. 3, the means for inverting and the means for converting are combined into a single DC to DC converter represented as the inverter 336.

The inverter 336 receives a control input 338 which is responsive to a current limit set point. The current limit set point can be used to control the charge rate of the capacitor. As with the FIG. 2 embodiment, a high current limit set point will recharge the capacitor at a relatively fast rate and thus permit levels of longer operation at higher motor torque or speed, at the expense of a limited range. On the contrary, a low current limit will reduce the rate at which the capacitor is recharged to its fully charged voltage state. A low current limit will enhance the overall range of operation, but will limit the power at which the motor can be operated. This latter mode of operation will extend battery life. In an exemplary embodiment where the motor 310 is used in an electric vehicle, the inverter 336 can be controlled in response to a control input 338 which is set by the user via an adjustable set point 340.

In operation, the FIG. 3 system can charge the capacitor 306 to a voltage greater than of the battery by controlling the inverter 336. The voltage differential between the battery and the capacitor is, for example, 12 volts. In this case, the battery voltage could be 48 volts while that of the ultracapacitor could be 60 volts. The inverter 336 generates an AC output wave in response to receipt of a DC input from the battery 302. For example, the inverter 336 can create a sinusoidal wave from the DC voltage input as a relatively high voltage AC waveform which is then converted back to a DC voltage for input to the capacitor 306. Such inverters for providing DC-AC-DC operation are well known and are commercially available.

To accommodate the voltage differential between the battery 302 and the capacitor 306, the diode 342 has a 12 volt drop for the example discussed above. The battery voltage in combination with the diode voltage constitute the voltage available at the capacitor 306. However, current only passes through the diode in a direction from the battery to the capacitor when the capacitor voltage falls below that of the battery. This arrangement ensures that peak load demands will be supplied from the capacitor even when a low internal resistance ratio of the capacitor to the battery is not possible. In this sense, the diode functions as an automatic switch which selectively recharges the capacitor.

While the FIG. 3 system has been described as including an alternator, it will be appreciated that there is no need to include such a feature. Rather, a flywheel alone can be used as a recharging mechanism. However, the use of an alternator could result in increased efficiency and can be used in conjunction with any of the circuits described above.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for supplying power comprising:

a power source;

a capacitor connected in parallel with said power source;

means for charging said capacitor to a voltage greater than or equal to said power source;

a recharging means for recharging said power source stored; and a switch connected between said power source and said capacitor for blocking a recharging current of said recharging means from charging said power source, but allowing a current from said power source to charge said capacitor.

2. Apparatus according to claim 1, wherein said switch is a diode.

3. Apparatus for supplying power comprising:

a power source having a first internal resistance;

a capacitor connected in parallel with said power source and having a second internal resistance; and means for maintaining a voltage of said capacitor equal to a voltage of said power source, and for regulating current from said power source to maintain said current below a predetermined limit during a regenerative mode of operation.

4. Apparatus for supplying power to a load comprising:

a power source;

a capacitor connected in parallel with said power source; and a switch for selectively restricting regenerative charging current supplied to said power source relative to regenerative charging current supplied to said capacitor, to charge said capacitor to a voltage greater than said power source during a regenerative mode of operation.

5. Apparatus according to claim 4, wherein said switch means is a diode.

6. Apparatus according to claim 4, wherein said switch is a diode and a transistor corrected in series.

* * * * *